United States Patent
Vargantwar et al.

(10) Patent No.: US 9,197,333 B1
(45) Date of Patent: Nov. 24, 2015

(54) METHOD AND SYSTEM FOR CONNECTION ESTABLISHMENT

(75) Inventors: Sachin R. Vargantwar, Overland Park, KS (US); Siddharth S. Oroskar, Overland Park, KS (US); Manoj Shetty, Mumbai (IN); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 234 days.

(21) Appl. No.: 13/113,742

(22) Filed: May 23, 2011

(51) Int. Cl.
*H04B 17/00* (2015.01)

(52) U.S. Cl.
CPC ..................................... *H04B 17/00* (2013.01)

(58) Field of Classification Search
CPC .................................................... H01L 1/0026
See application file for complete search history.

(56) References Cited

U.S. PATENT DOCUMENTS

| | | | |
|---|---|---|---|
| 6,366,779 B1 | 4/2002 | Bender et al. | |
| 6,741,861 B2 | 5/2004 | Bender et al. | |
| 7,120,443 B2 | 10/2006 | Malladi et al. | |
| 7,339,906 B1 | 3/2008 | Dahlby et al. | |
| 7,586,868 B2 | 9/2009 | Milton et al. | |
| 7,630,719 B2 | 12/2009 | Bender et al. | |
| 7,720,504 B2 * | 5/2010 | Murata et al. | 455/550.1 |
| 8,223,072 B2 * | 7/2012 | Ponnuswamy | 342/374 |
| 8,391,412 B1 * | 3/2013 | Oroskar et al. | 375/308 |
| 2002/0082032 A1 * | 6/2002 | Hunzinger | 455/510 |
| 2003/0171124 A1 | 9/2003 | Kataoka | |
| 2004/0001530 A1 * | 1/2004 | Lyle et al. | 375/132 |
| 2005/0014506 A1 | 1/2005 | Thorson et al. | |
| 2006/0014557 A1 * | 1/2006 | Rajkotia et al. | 455/522 |
| 2006/0019687 A1 | 1/2006 | Garg et al. | |
| 2007/0140252 A1 | 6/2007 | Akhtar et al. | |
| 2009/0316621 A1 * | 12/2009 | Lane et al. | 370/326 |
| 2010/0061258 A1 * | 3/2010 | Seo et al. | 370/252 |

OTHER PUBLICATIONS

3rd Generation Partnership Project 2, "Upper Layer (Layer 3) Signaling Standard for cmda2000 Spread Spectrum Systems, Release D (C.S0005-D v2.0)" dated Sep. 6, 2005, pp. B-1 to B-5.
BSC6680 Troubleshooting Guide, "Introduction to the MS Access Procedure," Huawei Technologies Co., Ltd., Jan. 25, 2008, retrieved from website <ftp://77.109.0.93/Nortel/bsc6680/data/31182986_02.cdp/outfiles/leap-bsc-documents.files/bsc1/bsc-troubleshooting/bsc-7-18.html>.
Marin, Scott et al., "IOSv5.0 Stage 3TrFO/RTO Call Flow Example," 3G 3rd Generation Partnership Project 2 "3GPP2", pp. 1-6, Oct. 29, 2003.
Yang, Samuel C., 3G CDMA2000: wireless system engineering, pp. 96-101, 2004.

* cited by examiner

*Primary Examiner* — Huy D Vu
*Assistant Examiner* — Bao G Nguyen (57) ABSTRACT

During connection establishment, an access network and/or an access terminal may decide whether to transmit bearer-traffic data rather than null-traffic data based on a channel quality of a wireless link. For example, if the access network has forward bearer-traffic data ready for transmission to the access terminal during connection establishment, the access network may decide to transmit that forward bearer-traffic data rather than forward null-traffic data in response to determining that a forward-channel quality of the wireless link is sufficient to carry such data. As another example, if the access terminal has reverse bearer-traffic data ready for transmission to the access network during connection establishment, the access terminal may decide to transmit that reverse bearer-traffic data rather than reverse null-traffic data in response to determining that a reverse-channel quality of the wireless link is sufficient to carry such data.

20 Claims, 6 Drawing Sheets

METHOD AND SYSTEM FOR CONNECTION ESTABLISHMENT

BACKGROUND

To provide cellular wireless service, a wireless-service provider typically employs an access network that provides wireless connectivity to one or more access terminals (e.g., cell phones, PDAs, laptops, netbooks, tablets, and/or other wirelessly-equipped devices) located in a region. This region may be divided geographically into a number of coverage areas, such as cells and sectors, each defined by a radio-frequency (RF) radiation pattern from a respective base transceiver station (BTS). Within each coverage area, the BTS's RF-radiation pattern may provide one or more wireless links, each on a carrier (or set of carriers), over which access terminals may communicate with the access network. In turn, the access network may provide connectivity with the one or more transport networks, such as the public switched telephone network (PSTN) and/or the Internet.

The access network's wireless links may carry communications between the access network and the access terminals according to any of a variety of wireless protocols. Depending on the protocol employed, each wireless link may also be divided into a plurality of channels for carrying communications between the access network and the access terminals. For instance, each wireless link may include a plurality of forward-link channels, such as shared forward-control channels and dedicated forward-traffic channels, for carrying communications from the access network to the access terminals. Similarly, each wireless link may include a plurality of reverse-link channels, such as shared reverse-control channels and dedicated reverse-traffic channels, for carrying communications from the access terminals to the access network.

Within this arrangement, an access terminal and the access network may establish a wireless connection in various different ways. According to one example, in response to receiving an access probe (e.g., an origination message or a page-response message) from the access terminal via a shared reverse-control channel, the access network may assign dedicated forward- and reverse-traffic channels to the access terminal. In turn, the access network may transmit to the access terminal, via a shared forward-control channel, a channel-assignment message that includes identifying information for the assigned forward- and reverse-traffic channels. Additionally, the access network may begin transmitting to the access terminal, via the assigned forward-traffic channel, a series of forward null-traffic data frames.

After receiving the channel-assignment message, the access terminal may acquire the assigned forward-traffic channel and begin listening for the null-traffic data frames sent by the access network. Thereafter, if the access terminal successfully receives a given number of (e.g., two) consecutive null traffic-channel frames on the assigned forward-traffic channel, the access terminal may responsively transmit to the access network, via the assigned reverse-traffic channel, a traffic channel preamble followed by a series of reverse null-traffic data frames. In turn, if the access network successfully receives the preamble as well as a given number of (e.g., two) consecutive null traffic-channel frames on the assigned reverse-traffic channel, the access network may responsively transmit an acknowledgment to the access terminal via the forward-traffic channel. Finally, the access network and the access terminal engage in a service negotiation and then begin exchanging bearer-traffic data (e.g., voice data or packet-data) on the assigned forward and reverse channels.

Overview

The example connection-establishment procedure described above may generally work well to establish a connection between an access network and an access terminal. In some circumstances, however, it may be desirable to have a connection-establishment procedure in which the access network and the access terminal can begin successfully exchanging bearer-traffic data over the connection without first engaging in an entire connection-establishment procedure, so as to reduce the delay in transmitting bearer-traffic data after initiation of the connection establishment. Such a connection-establishment procedure would be particularly desirable in circumstances where the communication session between the access network and access terminal takes the form of a short data burst.

Disclosed herein is such a connection-establishment procedure. In the disclosed connection-establishment procedure, an access network and/or an access terminal may decide whether to transmit bearer-traffic data rather than null-traffic data based on a channel quality of the wireless link over which the connection is to be established. For example, if the access network has forward bearer-traffic data ready for transmission to the access terminal during connection establishment, the access network may decide to transmit that forward bearer-traffic data rather than forward null-traffic data in response to determining that a forward-channel quality of the wireless link is sufficient to carry the forward bearer-traffic data. As another example, if the access terminal has reverse bearer-traffic data ready for transmission to the access network during connection establishment, the access terminal may decide to transmit that reverse bearer-traffic data rather than reverse null-traffic data in response to determining that a reverse-channel quality of the wireless link is sufficient to carry the reverse bearer-traffic data.

Advantageously, by transmitting bearer-traffic data instead of forward null-traffic data when the channel quality of the wireless link is sufficient to carry such bearer-traffic data, the disclosed connection-establishment procedure may expedite the transmission of at least a first set of bearer-traffic data frames. This expedited transmission may be particularly beneficial in circumstances where the communication session between the access network and the access terminal consists solely of that set of bearer-traffic data frames, because such a communication session can be completed much more quickly.

One embodiment of the disclosed connection-establishment procedure may take the form of a method that includes (a) receiving an access probe (e.g., a page response) from a given access terminal on a given wireless link, (b) assigning a forward-traffic channel of the given wireless link to the given access terminal, (c) based at least in part on a forward-channel quality of the given wireless link, deciding to transmit forward bearer-traffic data rather than forward null-traffic data to the access terminal on the assigned forward-traffic channel, and (d) in response to the deciding, transmitting the forward bearer-traffic data to the given access terminal on the assigned forward-traffic channel.

The feature of deciding to transmit forward bearer-traffic data rather than forward null-traffic data based on the forward-channel quality of the given wireless link may take various forms. In one example, this feature may include determining whether a forward-channel quality of the given wireless link exceeds a threshold quality.

In another example, this feature includes deciding to transmit forward bearer-traffic data rather than forward null-traffic data based on an indicator of forward-channel quality of the given wireless link contained in the access probe. For instance, if the indicator is a value for the forward-channel quality of the given wireless link as measured by the given access terminal, this feature may include comparing the value to a threshold quality value and thereby determining that the value exceeds the threshold quality value. Alternatively, if the indicator is a data bit specifying that the forward-channel quality of the given wireless link as measured by the given access terminal is above a threshold quality value, this feature may include simply determining a value of the data bit. Other examples are possible as well.

The decision to transmit forward bearer-traffic data rather than forward null-traffic data may also take various forms. In one example, this decision may take the form of a decision to eliminate transmission of the null-traffic data entirely, in which case transmitting the forward bearer-traffic data may include transmitting the forward bearer-traffic data without first transmitting any null-traffic data. In another example, this decision may take the form of a decision to transmit a reduced amount of forward null-traffic data, in which case transmitting the forward bearer-traffic data may include transmitting the reduced amount of forward null-traffic data and then transmitting the forward bearer-traffic data. Other examples are possible as well.

Another embodiment of the disclosed connection-establishment procedure may take the form of a method that includes (a) transmitting an access probe (e.g., origination message) to an access network on a given wireless link, (b) as a result of transmitting the access probe, receiving from the access network a channel-assignment message identifying an assigned reverse-traffic channel of the given wireless link, (c) based at least in part on a reverse-channel quality of the given wireless link, deciding to transmit reverse bearer-traffic data rather than reverse null-traffic data to the access terminal on the assigned reverse-traffic channel, and (d) in response to the deciding, transmitting the reverse bearer-traffic data to the access network on the assigned reverse-traffic channel.

The feature of deciding to transmit reverse bearer-traffic data rather than reverse null-traffic data based on the forward-channel quality of the given wireless link may take various forms. In one example, this feature may include determining whether a reverse-channel quality of the given wireless link exceeds a threshold quality.

In another example, this feature may include deciding to transmit reverse bearer-traffic data rather than reverse null-traffic data based on an indicator of reverse-channel quality of the given wireless link contained in the channel-assignment message. For instance, if the indicator comprises a value for the reverse-channel quality of the given wireless link as measured by the access network, this feature may include comparing the value to a threshold quality value and thereby determining that the value exceeds the threshold quality value. Alternatively, if the indicator comprises a data bit specifying that the reverse-channel quality of the given wireless link as measured by the access network is above a threshold quality value, this feature may include simply determining a value of the data bit.

The decision to transmit reverse bearer-traffic data rather than reverse null-traffic data may also take various forms. In one example, this decision may take the form of a decision to eliminate transmission of the null-traffic data entirely, in which case transmitting the reverse bearer-traffic data may include transmitting the reverse bearer-traffic data without first transmitting any null-traffic data. In another example, this decision may take the form of a decision to transmit a reduced amount of reverse null-traffic data, in which case transmitting the reverse bearer-traffic data may include transmitting the reduced amount of reverse null-traffic data and then transmitting the reverse bearer-traffic data.

Also disclosed herein is a base station that includes (a) an access-terminal communication interface configured to facilitate communication with one or more access terminals via one or more wireless links, (b) an access-network communication interface configured to facilitate communication with one or more access-network entities, (c) a processor, (d) data storage, and (e) program instructions stored in data storage and executable by the processor to carry out features described herein.

Also disclosed herein is an access terminal including (a) an wireless-communication interface configured to facilitate wireless communication with an access network via one or more wireless links, (b) a processor, (c) data storage, and (d) program instructions stored in data storage and executable by the processor to carry out features described herein.

These as well as other aspects and advantages will become apparent to those of ordinary skill in the art by reading the following detailed description, with reference where appropriate to the accompanying drawings.

DETAILED DESCRIPTION

I. Communication System

Figure 1:
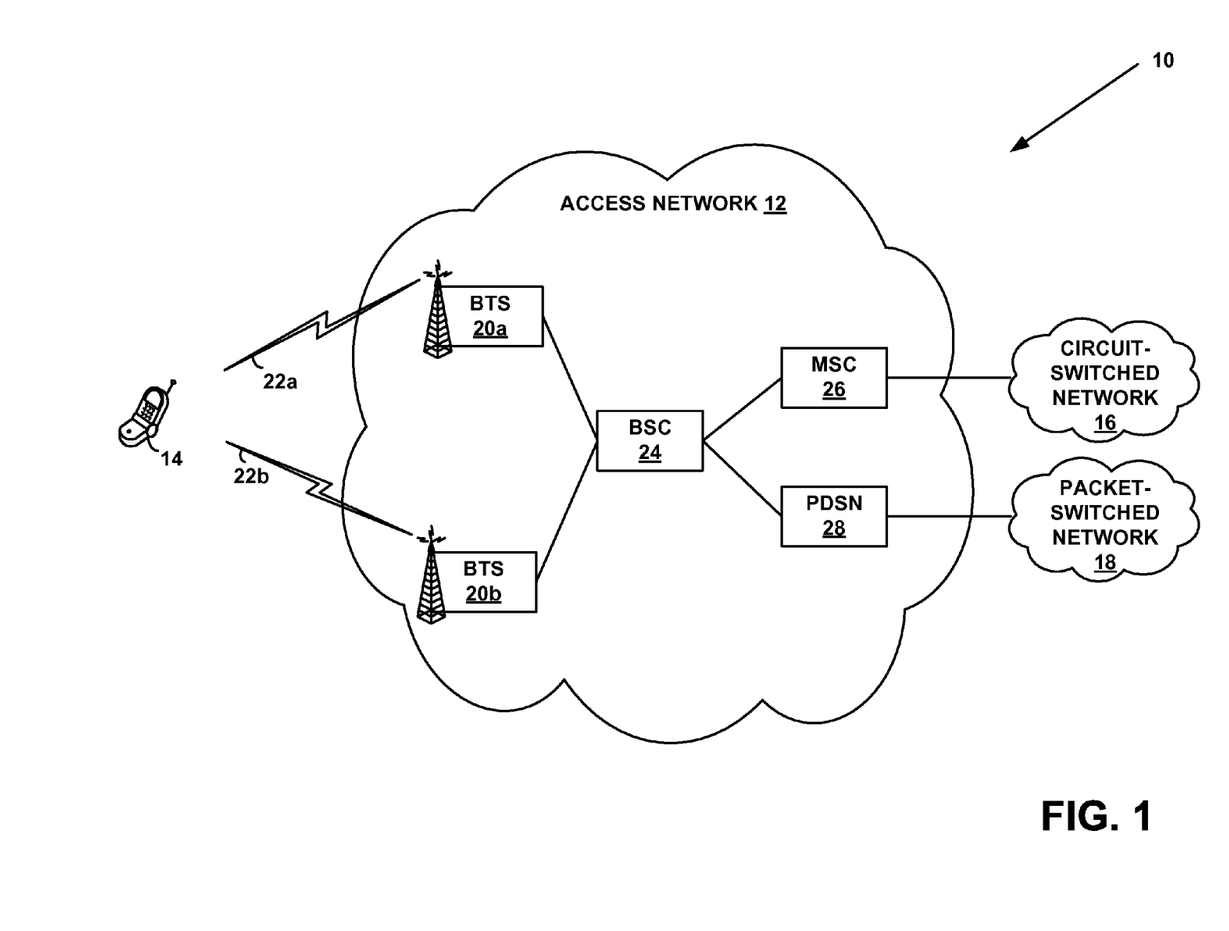
FIG. 1 is a simplified block diagram of a communication system in which a connection-establishment procedure can be implemented.

Referring to the drawings, FIG. 1 is a simplified block diagram of a communication system 10 in which a connection-establishment procedure can be implemented. As shown, the system 10 may include an access network 12 that functions to provide connectivity between one or more access terminals, such as active access terminal 14, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether.

Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include one or more base transceiver stations (BTSs), such as BTS 20a and BTS 20b. (Although FIG. 1 depicts access network 12 as including two BTSs, it should be understood that access network 12 may include more than two BTSs.) Each BTS may be any entity that facilitates wireless communication between access network 12 and one or more access terminals, such as access terminal 14. In particular, each BTS may radiate to define one or more wireless coverage areas, such as a cell and/or cell sectors. Within each of its coverage areas, each BTS may provide one or more wireless links over which one or more access terminals may communicate with the BTS. For example, as shown, BTS 20a may be configured to provide a first wireless link 22a, and BTS 20b may be configured to provide a second wireless link 22b. Various other configurations are possible as well. Each BTS may also control aspects of wireless communication with access terminal 14, such as aspects of connection establishment, handoff, and/or power control for instance. Each BTS may perform other functions as well.

Each wireless link may carry communications between its associated BTS and one or more access terminals according to any of a variety of protocols, including EIA/TIA/IS-2000 Rel. 0, Rel. A, or other versions thereof ("IS-2000"), EIA/TIA/IS-856 Rel. 0, Rev. A, or other versions thereof ("IS-856"), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed.

Each wireless link may also be divided into (i) a forward link for carrying communications from the BTS to one or more access terminals and (ii) a reverse link for carrying communications from the one or more access terminals to the BTS. In turn, the forward and reverse link may each be divided into a plurality of channels using any mechanism now known or later developed, including code-division multiplexing, time-division multiplexing, and/or frequency-division multiplexing. For instance, the forward link may be divided into a plurality of forward-link channels, such as shared forward-control channels configured to carry overhead data (e.g., page requests, channel-assignment messages, etc.) and dedicated forward-traffic channels configured to carry traffic data. Similarly, the reverse link may be divided into a plurality of reverse-link channels, such as shared reverse-control channels configured to carry overhead data (e.g., origination messages, page responses, etc.) and dedicated reverse-traffic channels configured to carry traffic data. Other link and channel configurations are possible as well.

As shown in FIG. 1, access network 12 may also include at least one base station controller (BSC), such as BSC 24, where each BTS is coupled to one such BSC. (And although FIG. 1 depicts access network 12 as including one BSC, it should be understood that access network 12 might include more than one BSC, in which case each BSC may couple to a subset of the BTSs in access network 12. Further, although BSC 24 is depicted as a separate entity from BTSs 20a-b, it should be understood that BSC 24 may be integrated together in whole or in part with one or both of BTSs 20a-b. Further yet, BSC 24 and one or both of BTSs 20a-b may together be referred to as a "base station.") BSC 24 may control aspects of BTSs 20a-b as well as aspects of wireless communication with access terminal 14, such as aspects of connection establishment, handoff, and/or power control for instance. BSC 24 may perform other functions as well.

Further, access network 12 may include at least one mobile switching center (MSC), such as MSC 26, where each BSC, such as BSC 24, is coupled to one such MSC. (And although FIG. 1 depicts access network 12 as including one MSC, it should be understood that access network 12 may include more than one MSC, in which case each MSC may couple to a subset of the BSCs in access network 12.) As shown, MSC 26 may provide connectivity with circuit-switched network 16. Further, MSC 26 may control aspects of BTS 20 and/or BSC 24 as well as aspects of wireless communication with access terminal 14, such as aspects of connection establishment, handoff, and/or power control for instance. MSC 26 may perform other functions as well.

Further yet, access network 12 may include at least one packet data serving node (PDSN), such as PDSN 28, where each BSC, such as BSC 24, is coupled to one such PDSN. (And although FIG. 1 depicts access network 12 as including one PDSN, it should be understood that access network 12 may include more than one PDSN, in which case each PDSN may couple to a subset of the BSCs in access network 12.) As shown, PDSN 28 may provide connectivity with packet-switched network 16. PSDN 28 may perform other functions as well.

Although not shown, access network 12 may also include and/or have access to various other entities. For example, access network 12 may include or have access to a home location register (HLR) and/or a visitor location register (VLR) that maintains profile data for subscribers and/or access terminals in access network 12, such as account information, preferences, and/or a last-known location for instance. Other examples are possible as well.

Access terminal 14 may be any device configured to receive wireless service from access network 12. By way of example, access terminal 14 may take the form of (or at least include) a cellular telephone, a computer (e.g., a desktop, laptop, tablet, netbook, etc.), a personal digital assistant (PDA), or a personal navigation device (PND). Other examples are possible as well.

II. Example Connection-Establishment Procedure

Figure 2:
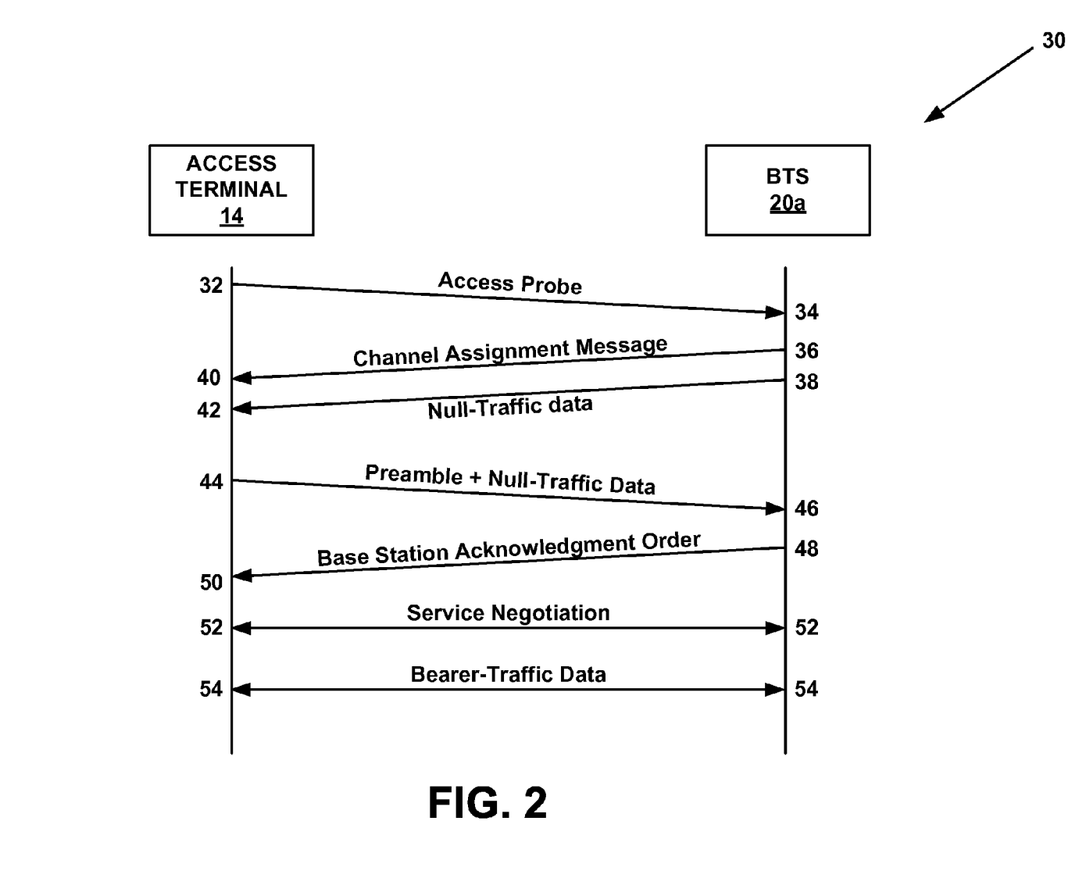
FIG. 2 is a message flow diagram that illustrates an example connection-establishment procedure between an access network and an access terminal on a wireless link.

In the example communication system 10 of FIG. 1, access network 12 and access terminal 14 may establish a connection on a wireless link in various manners. FIG. 2 is a message-flow diagram that illustrates an example connection-establishment procedure between access network 12 and access terminal 14 on wireless link 22a. It should be understood that the messages described herein are set forth for purposes of example only.

As shown in FIG. 2, procedure 30 begins at step 32 with access terminal 14 transmitting an access probe to access network 12, and in particular BTS 20a, via a shared reverse-control channel (e.g., an access channel) of wireless link 22a. This access probe may take various forms. As one example, the access probe may be a page-response message that access terminal 14 transmits in response to receiving a page-request message from BTS 20a. As another example, the access probe may be an origination message that access terminal 14 transmits in response to a user request. Other examples are possible as well.

At step 34, BTS 20a may receive the access probe via the shared reverse-control channel of wireless link 22a. In turn, at step 36, BTS 20a may assign dedicated forward- and reverse-traffic channels of wireless link 22a to access terminal 14 and then transmit to access terminal 14, via a shared forward-control channel (e.g., a paging channel) of wireless link 22a, a channel-assignment message (e.g., an extended channel-assignment message (ECAM)) that includes identifying information for the assigned dedicated forward and reverse-traffic channels. Additionally, at step 38, access network 12 may begin transmitting a series of forward null-traffic data frames to access terminal 14 via the assigned forward-traffic channel of wireless link 22a.

At step 40, access terminal 14 may receive the channel-assignment message via the shared forward-control channel of wireless link 22a. In turn, access terminal 14 may acquire the assigned dedicated forward-traffic channel identified in the channel-assignment message and then begin listening for null-traffic data frames sent by BTS 20a. At step 42, access terminal 14 may then successfully receive a given number of (e.g., two) consecutive null traffic-channel frames via the assigned dedicated forward-traffic channel of wireless link 22a, thereby indicating that the dedicated forward-traffic channel has a sufficient channel quality to support a communication session between BTS 20a and access terminal 14. In response, at step 44, access terminal 14 may transmit to BTS 20a via the assigned dedicated reverse-traffic channel a traffic-channel preamble followed by a series of reverse null-traffic data frames.

At step 46, BTS 20a may successfully receive the preamble as well as a given number of (e.g., two) consecutive reverse null traffic-channel frames via the assigned dedicated reverse-traffic channel of wireless link 22a, thereby indicating that the dedicated reverse-traffic channel also has a sufficient channel quality to support the communication session between BTS 20a and access terminal 14. In response, at step 48, BTS 20a may transmit a Base Station Acknowledgment Order to access terminal 14 via the dedicated forward-traffic channel of wireless link 22a. In turn, at step 50, access terminal 14 may receive the Base Station Acknowledgment Order via the dedicated forward-traffic channel of wireless link 22a.

At step 52, BTS 20a and access terminal 14 may engage in service negotiation on the dedicated forward- and reverse-traffic channels. Thereafter, at step 54, BTS 20a and access terminal 14 may begin exchanging bearer-traffic data (e.g., voice data or packet-data) on the dedicated forward and reverse channels.

Example connection-establishment procedure 30 illustrated in FIG. 2 may generally work well to establish a connection between access network 12 and access terminal 14. In some circumstances, however, it may be desirable to have a connection-establishment procedure in which access network 12 and access terminal 14 can begin successfully exchanging bearer-traffic data over that connection without first engaging in the entire connection-establishment procedure 30, so as to reduce the delay in transmitting bearer-traffic data after initiation of the connection establishment. Such a connection-establishment procedure would be especially desirable in circumstances where the communication session between access network 12 and access terminal 14 takes the form of a short data burst (e.g., 64 bits or less).

III. Disclosed Connect Establishment Procedure

Disclosed herein is such a connection-establishment procedure, according to which access network 12 and/or access terminal 14 may decide whether to transmit bearer-traffic data rather than null-traffic data based on a channel quality of the wireless link over which the connection is to be established (e.g., wireless link 22a). For example, if access network 12 has forward bearer-traffic data ready for transmission to access terminal 14 during connection establishment, access network 12 may decide to transmit that forward bearer-traffic data rather than forward null-traffic data in response to determining that a forward-channel quality of wireless link 22a is sufficient to carry the forward bearer-traffic data. As another example, if access terminal 14 has reverse bearer-traffic data ready for transmission to access network 12 during connection establishment, access terminal 14 may decide to transmit that reverse bearer-traffic data rather than reverse null-traffic data in response to determining that a reverse-channel quality of wireless link 22a is sufficient to carry the reverse bearer-traffic data. These examples are described in further detail below.

Advantageously, by enabling transmission of bearer-traffic data rather than forward null-traffic data when the channel quality of the wireless link is sufficient to carry such bearer-traffic data, the disclosed connection-establishment procedure may expedite the transmission of at least a first set of bearer-traffic data frames. This expedited transmission may be particularly beneficial in circumstances where the communication session between access network 12 and access terminal 14 consists solely of that set of bearer-traffic data frames, because such a communication session can be completed much more quickly.

a. A First Embodiment

Figure 3:
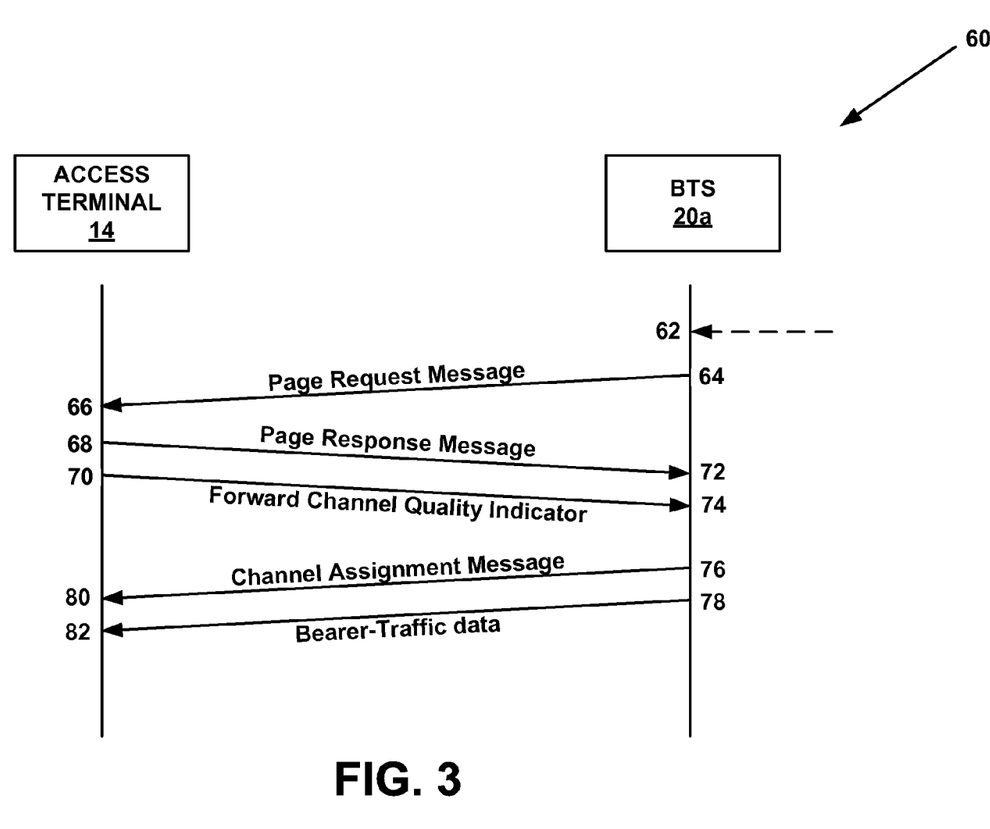
FIG. 3 is a message flow diagram that illustrates a first embodiment of a disclosed connection-establishment procedure

FIG. 3 is a message-flow diagram that illustrates a first embodiment 60 of the disclosed connection-establishment procedure. For purposes of illustration, first embodiment 60 will be described with reference to access network 12, and in particular BTS 20a, initiating a connection establishment with access terminal 14 on wireless link 22a. It should be understood, however, that first embodiment 60 may be applicable to any connection establishment between an access-network entity and an access terminal. It should also be understood that the messages described herein are set forth for purposes of example only, and that certain messages can be added, removed, and/or replaced without departing from the spirit of the disclosed connection-establishment procedure.

As shown in FIG. 3, first embodiment 60 begins at step 62 with BTS 20a receiving a request to transmit given forward bearer-traffic data (e.g., voice data, packet data, etc.) to access terminal 14. BTS 20a may receive this request over various paths. As one example, BTS 20a may receive this request from a circuit-switched device over a path that includes circuit-switched network 16, MSC 26, and RNC 24. As another example, BTS 20a may receive this request from a packet-switched device over a path that includes circuit-switched network 18, PDSN 28, and RNC 24. As yet another example, BTS 20a may receive this request from an access terminal over a path that includes wireless link 22b, BTS 20b and RNC 24. Many other examples are possible as well.

At step 64, in response to receiving the request, BTS 20a may initiate a connection-establishment procedure with access terminal 14 by transmitting one or more page-request messages directed to access terminal 14 via a shared forward-control channel (e.g., a paging channel) of wireless link 22a.

At step 66, access terminal 14 may receive a given one of the one or more pages request messages via the shared forward-control channel of wireless link 22a. In turn, at step 68, access terminal 14 may transmit a page-response message to BTS 20a via a shared reverse-control channel (e.g., an access channel) of wireless link 22a.

At step 70, access terminal 14 may also transmit an indicator of forward-channel quality of wireless link 22a to BTS 20a via the shared reverse-control channel of wireless link 22a. In this respect, access terminal 14 may transmit the indicator either in the page-response message (in which case step 68 and step 70 collapse into a single step) or in a separate message. This indicator may take various forms. As one example, the indicator may take the form of a value for the forward-channel quality of wireless link 22a as measured by access terminal 14 (e.g., a signal-to-noise ratio (SNR) value, a carrier-to-interference noise ratio (CINR) value, a chip-energy-to-total-RF-energy (Ec/Io) value, and/or received signal strength indicator (RSSI) value). As another example, the indicator may take the form of a data bit having a first value (e.g., 1) if the forward-channel quality of wireless link 22a as measured by access terminal 14 is above a threshold quality and a second value (e.g., 0) if the forward-channel quality of wireless link 22a as measured by access terminal 14 is below the threshold quality. Other examples are possible as well.

At step 72, BTS 20a may receive the page-response message via the shared reverse-control channel of wireless link 22a. Additionally, at step 74, BTS 20a may receive the forward-channel-quality-indicator via the shared reverse-control channel of wireless link 22a. (Given that forward-channel-quality-indicator may be included within the page-response message, it should also be understood that steps 72 and 74 may collapse into a single step).

At step 76, after receiving the page-response message, BTS 20a may assign dedicated forward- and reverse-traffic channels of wireless link 22a to access terminal 14 and then transmit to access terminal 14, via the shared forward-control channel, a channel-assignment message (e.g., an extended channel-assignment message (ECAM)) that includes identifying information for the assigned dedicated forward- and reverse-traffic channels.

After receiving the page-response message, BTS 20a may also decide, based on a forward-channel quality of wireless link 22a, whether to transmit forward bearer-traffic data rather than forward null-traffic data on the assigned forward-traffic channel of wireless link 22a (e.g., either by eliminating the transmission of null-traffic data completely or by transmitting a reduced amount of null-traffic data). BTS 20a may carry out this decision in various manners.

According to a preferred technique, BTS 20a may decide whether to transmit forward bearer-traffic data rather than forward null-traffic data by determining whether a forward-channel quality of wireless link 22a exceeds a threshold quality. For instance, BTS 20a may decide to transmit forward bearer-traffic data rather than forward null-traffic data in response to determining that the forward-channel quality of wireless link 22a is greater than the threshold quality. Alternatively, BTS 20a may decide not to transmit forward bearer-traffic data rather than forward null-traffic data in response to determining that the forward-channel quality of wireless link 22a is less than the threshold quality. BTS 20a may perform this determination in various manners.

In one embodiment, BTS 20a may perform this determination based on the indicator of forward-channel quality of wireless link 22a sent by access terminal 14. For example, if the indicator includes a measured value for the forward-channel quality of wireless link 22a, BTS 20a may determine whether the forward-channel quality of wireless link 22a exceeds the threshold quality by comparing the measured value to a threshold quality value (e.g., an Ec/Io value better than −10). As another example, if the indicator includes a data bit specifying whether the forward-channel quality of wireless link 22a is above or below a threshold quality value, BTS 20a may determine whether the forward-channel quality of wireless link 22a exceeds a threshold quality by simply determining the value of the data bit. This determination may take other forms as well.

At step 78, in response to deciding to transmit forward bearer-traffic data rather than forward null-traffic data, BTS 20a may then begin transmitting the given forward bearer-traffic data to access terminal 14 via the assigned forward-traffic channel. This transmission may take various forms. In one example, BTS 20a may transmit the given forward bearer-traffic data to access terminal 14 without first transmitting any forward null-traffic data. In another example, BTS 20a may first transmit a reduced amount (e.g., 1 frame) of forward null-traffic data (which may facilitate synchronization on the traffic channel) and then begin transmitting the given forward bearer-traffic data after the reduced amount of forward null-traffic data. Other examples are possible as well.

At step 80, access terminal 14 may receive the channel-assignment message via the shared forward-control channel of wireless link 22a. In turn, access terminal 14 may acquire the assigned forward-traffic channel of wireless link 22a identified in the channel-assignment message and then begin listening for data sent by BTS 20a on the assigned forward-traffic channel.

At step 82, access terminal 14 may then receive the given forward bearer-traffic data via the assigned forward-traffic channel of wireless link 22a (either alone or together with the reduced amount of forward null-traffic data). Thereafter, depending on the nature of the given forward bearer-traffic data, the connection-establishment procedure may proceed in one of several different manners.

According to one example, if the given forward bearer-traffic data constitutes the only bearer-traffic data to be exchanged during the communication session, then no further exchange of bearer-traffic data will occur and the communication session will be complete.

According to another example, if the exchange of bearer-traffic data is to continue after the transmission of the given forward bearer-traffic data, access terminal 14 may respond to successfully receiving the given forward bearer-traffic data by transmitting a traffic channel preamble and a series of reverse null-traffic data frames to BTS 20a via the assigned dedicated reverse-traffic channel, as in example connection-establishment procedure 30 described above. In turn, BTS 20a and access terminal 14a may complete the connection-establishment procedure and then resume the exchange of bearer-traffic data until the communication session is complete.

According to yet another example, if the exchange of bearer-traffic data is to continue after the transmission of the given forward bearer-traffic data, access terminal 14 may respond to successfully receiving the given forward bearer-traffic data by transmitting reverse bearer-traffic data back to BTS 20a via the assigned reverse-traffic channel. In turn, BTS 20a and access terminal 14 may continue exchanging bearer-traffic data until the communication session is complete.

b. A Second Embodiment

Figure 4:
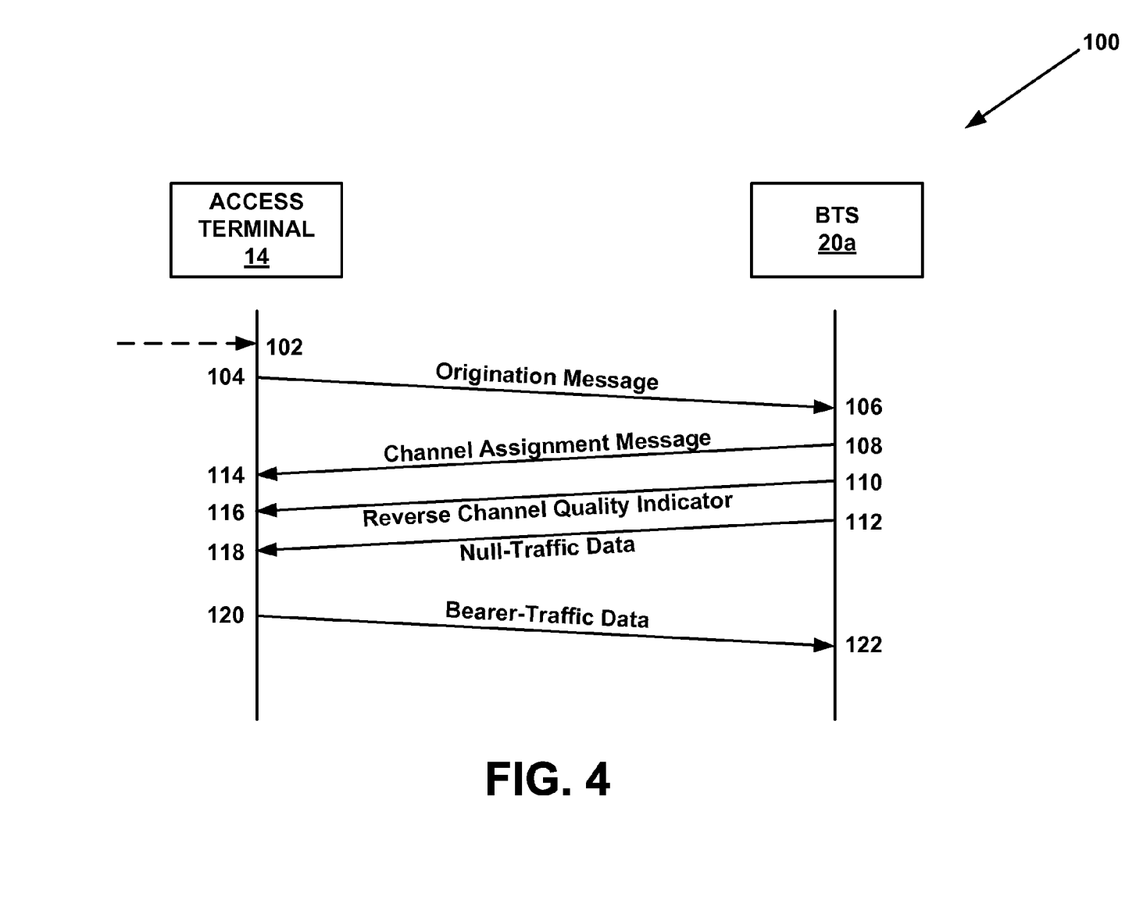
FIG. 4 is a message flow diagram that illustrates a second embodiment of the disclosed connection-establishment procedure.

FIG. 4 is a message flow diagram that illustrates a second embodiment 100 of the disclosed connection-establishment procedure. For purposes of illustration, second embodiment 100 will be described reference with to access terminal 14 initiating a connection establishment with access network 12, and in particular BTS 20*a*, on wireless link 22*a*. It should be understood, however, that second embodiment 100 may be applicable to any connection establishment between an access terminal and an access-network entity. It should also be understood that the messages described herein are set forth for purposes of example only, and that certain messages can be added, removed, and/or replaced without departing from the spirit of the disclosed connection-establishment procedure.

As shown in FIG. 4, second embodiment 100 begins at step 102 with access terminal 14 receiving a user request to transmit given reverse bearer-traffic data (e.g., voice data, packet data, etc.) to access terminal 14. This user request may take various forms. As one example, the user request may take the form of an instruction to transmit an email. Many other examples are possible as well.

At step 104, in response to receiving the user request, access terminal 14 may initiate a connection-establishment procedure with access network 12 by transmitting an origination message to BTS 20*a* via a shared reverse-control channel (e.g., an access channel) of wireless link 22*a*.

At step 106, BTS 20*a* may receive the origination message via the shared reverse-control channel of wireless link 22*a*. In turn, at step 108, BTS 20*a* may assign dedicated forward- and reverse-traffic channels of wireless link 22*a* to access terminal 14 and then transmit to access terminal 14, via the shared forward-control channel, a channel-assignment message (e.g., an extended channel-assignment message (ECAM)) that includes identifying information for the assigned dedicated forward- and reverse-traffic channels.

At step 108, after receiving the origination message, BTS 20*a* may also transmit an indicator of reverse-channel quality of wireless link 22*a* to access terminal 14 via the shared forward-control channel of wireless link 22*a*. In this respect, BTS 20*a* may transmit the indicator either in the channel-assignment message (in which case step 108 and step 110 collapse into a single step) or in a separate message. This indicator may take various forms. In one example, the indicator may take the form of a value for the reverse-channel quality of wireless link 22*a* as measured by BTS 20*a* (e.g., an SNR value, CINR value, Ec/Io value, and/or RSSI value). In another example, the indicator may take the form of a data bit having a first value (e.g., 1) if the reverse-channel quality of wireless link 22*a* as measured by BTS 20*a* is greater than a threshold quality and a second value (e.g., 0) if the forward-channel quality of wireless link 22*a* as measured by access terminal 14 is less than the threshold quality. Other examples are possible as well.

At step 112, after assigning the dedicated forward- and reverse-traffic channels of wireless link 22*a* to access terminal 14, BTS 20*a* may also begin transmitting a series of null-traffic data frames to access terminal 14 via the assigned dedicated forward-traffic channel.

At step 114, access terminal 14 may receive the channel-assignment message via the shared forward-control channel of wireless link 22*a*. In turn, access terminal 14 may acquire the assigned forward-traffic channel of wireless link 22*a* identified in the channel-assignment message and then begin listening for data sent by BTS 20*a* on the assigned forward-traffic channel. Additionally, at step 116, access terminal 14 may receive the reverse-channel-quality-indicator via the shared forward-control channel of wireless link 22*a*. (Given that forward-channel-quality-indicator may be included within the page-response message, it should also be understood that steps 114 and 116 may collapse into a single step).

At step 118, access terminal 14 may also receive the forward null-traffic data via the assigned forward-control channel of wireless link 22*a*.

Access terminal 14 may then decide, based on a reverse-channel quality of wireless link 22*a*, whether to transmit reverse bearer-traffic data rather than reverse null-traffic data (e.g., either by eliminating the transmission of null-traffic data completely or by transmitting a reduced amount of null-traffic data). Access terminal 14 may carry out this decision in various manners.

According to a preferred technique, access terminal 14 may decide whether to transmit reverse bearer-traffic data rather than reverse null-traffic data by determining whether a reverse-channel quality of wireless link 22*a* exceeds a threshold quality. For instance, access terminal 14 may decide to transmit reverse bearer-traffic data rather than reverse null-traffic data in response to determining that the reverse-channel quality of wireless link 22*a* is greater than the threshold quality. Alternatively, access terminal 14 may decide not to transmit reverse bearer-traffic data rather than reverse null-traffic data in response to determining that the reverse-channel quality of wireless link 22*a* is less than the threshold quality. Access terminal 14 may perform this determination in various manners.

In one embodiment, access terminal 14 may perform this determination based on the indicator of reverse-channel quality of wireless link 22*a* sent by BTS 20*a*. For example, if the indicator includes a measured value for the reverse-channel quality of wireless link 22*a*, access terminal 14 may determine whether the reverse-channel quality of wireless link 22*a* exceeds the threshold quality by comparing the measured value to a threshold quality value (e.g., an Ec/Io value better than −12). As another example, if the indicator includes a data bit specifying whether the reverse-channel quality of wireless link 22*a* is above or below a threshold quality value, access terminal 14 may determine whether the reverse-channel quality exceeds a threshold quality by simply determining the value of the data bit. This determination may take other forms as well.

At step 120, in response to deciding to transmit reverse bearer-traffic data rather than forward null-traffic data, access terminal 14 may then begin transmitting the given reverse bearer-traffic data to BTS 20*a* via the assigned forward-traffic channel. This transmission may take various forms. In one example, access terminal 14 may forego the transmission of reverse null-traffic data completely and instead begin transmitting the given reverse bearer-traffic data to access terminal 14. In another example, BTS 20*a* may first transmit a reduced amount (e.g., 1 frame) of reverse null-traffic data (which may facilitate synchronization of the traffic channel) and then begin transmitting the given reverse bearer-traffic data after the reduced amount of reverse null-traffic data. Other examples are possible as well.

At step 122, BTS 20*a* may receive the given reverse bearer-traffic data via the assigned reverse-traffic channel of wireless link 22*a* (either alone or together with the reduced amount of reverse null-traffic data). Thereafter, depending on the nature of the given reverse bearer-traffic data, the connection-establishment procedure may proceed in one of several different manners.

According to one example, if the given reverse bearer-traffic data constitutes the only bearer-traffic data to be exchanged during the communication session, then no further exchange of bearer-traffic data will occur and the communication session will be complete.

According to another example, if the exchange of bearer-traffic data is to continue after the transmission of the given reverse bearer-traffic data, BTS 20*a* may respond to successfully receiving the given reverse bearer-traffic data by transmitting a Base Station Acknowledgment Order to access terminal 14 via the dedicated forward-traffic channel of wireless link 22*a*, as in example connection-establishment procedure 30 described above. In turn, BTS 20*a* and access terminal 14*a* may complete the example connection-establishment procedure and then resume the exchange of bearer-traffic data until the communication session is complete.

According to yet another example, if the exchange of bearer-traffic data is to continue after the transmission of the given reverse bearer-traffic data, BTS 20*a* may respond to successfully receiving the given reverse bearer-traffic data by transmitting forward bearer-traffic data back to BTS 20*a* via the assigned forward-traffic channel. In turn, BTS 20*a* and access terminal 14 may continue exchanging bearer-traffic data until the communication session is complete.

IV. Exemplary Base Station

Figure 5:
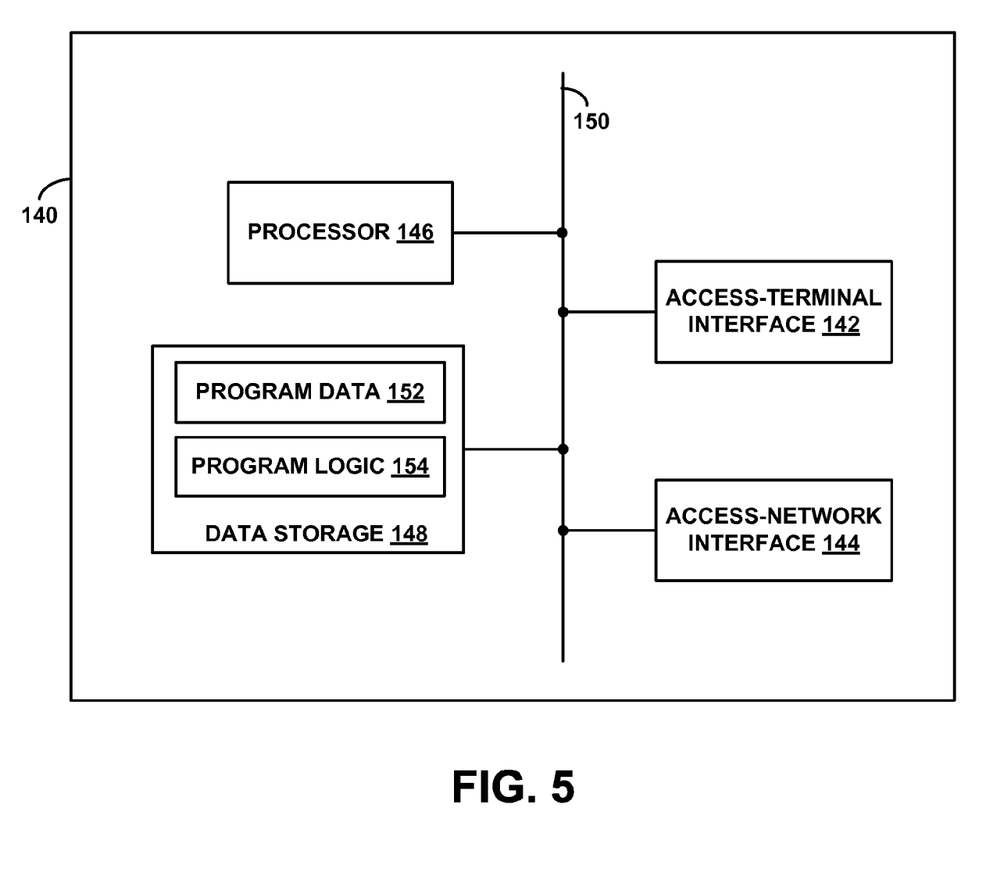
FIG. 5 is a simplified block diagram showing functional components of an exemplary base station that is configured to carry out features of the disclosed connection-establishment procedure.

FIG. 5 is a simplified block diagram showing functional components of an exemplary base station 140 that is configured to carry out features of the disclosed connection-establishment procedure. As shown in FIG. 5, exemplary base station 140 may include an access-terminal communication interface 142, an access-network communication interface 144, a processor 146, and data storage 148, all linked together via a system bus, network, or other connection mechanism 150. Base station 140 may include other components as well.

Referring to FIG. 5, access-terminal communication interface 142 may radiate to define one or more wireless coverage areas and provide one or more wireless links, such as wireless link 22*a*, over which access terminals may communicate with base station 140. As such, access-terminal communication interface 142 may include one or more antenna structures arranged in various ways (e.g., one or more directional or sectored antennas). Additionally, access-terminal communication interface 142 may include at least one power amplifier for each provided wireless link. Each such power amplifier may enable base station 140 to adjust both its total transmission power on each forward link and its transmission power on each respective channel of each forward link. Each such power amplifier may also define practical limits on the maximum and minimum power levels at which base station 140 can transmit on each forward link and each respective channel of each forward link. Other configurations are possible as well.

Access-network communication interface 144 may be configured to communicatively couple base station 140 to various other access network entities, such as one or more MSCs and/or one or more PDSNs for instance. To facilitate these couplings, access-network communication interface 144 may take various forms. For example, access-network communication interface 144 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an access network entity. Access-network communication interface 144 may also include some combination of different interfaces types. Other configurations are possible as well.

Processor 146 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 148, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 146. Further, some data storage mediums may be external to and/or removable from base station 140 and may interface with base station 140 in various manners. As shown, data storage 148 may contain (i) program data 152 and (ii) program logic 154, which may be maintained either separately or together within data storage 148.

Program data 152 may contain information relating to wireless links over which base station 140 may communicate with access terminals. For example, program data 152 may contain an identifier of each such wireless link (e.g., a carrier frequency and a PN offset). As another example, program data 152 may contain identifiers of forward and/or reverse channels on each such wireless link (e.g., MAC IDs and/or Walsh codes). As yet another example, program data 152 may contain data defining each coverage area served by each such wireless link (e.g., indications of the shape, size, and/or location of each coverage area). As still another example, program data 152 may contain indicators of forward and/or reverse-channel quality for each such wireless link. Other examples are possible as well.

Further, program data 152 may contain information relating to one or more access terminals being served by base station 140. For example, program data 152 may contain an identifier of each such access terminal. As another example, program data 152 may contain an identifier of a wireless link serving each such access terminal. As yet another example, program data 152 may contain identifiers of any forward and/or reverse channels established with each such access terminal (e.g., MAC IDs and/or Walsh codes). Other examples are possible as well.

Program logic 154 preferably comprises machine-language instructions that may be executed or interpreted by processor 146 to carry out functions in accordance with the disclosed connection-establishment procedure. For example, according to a first embodiment, program logic 154 may be executable by processor 146 to carry out functions including (a) receiving a page-response message from an access terminal via a shared reverse-control channel of a wireless link (where the page-response message may contain an indicator of forward-channel quality of the wireless link), (b) assigning a forward-traffic channel of the wireless link to the access terminal, (c) based on a forward-channel quality of the wireless link, deciding to transmit forward bearer-traffic data rather than forward null-traffic data on the assigned forward-traffic channel of the wireless link, and (d) in response to the deciding, transmitting the forward bearer-traffic data to the access terminal via the assigned forward-traffic channel. Program logic 154 may be executable by processor 146 to carry out various other functions in the first embodiment as well.

As another example, according to a second embodiment, program logic 154 may be executable by processor 146 to carry out functions including (a) receiving an origination message from an access terminal via a shared reverse-control channel of a wireless link, (b) transmitting to the access terminal, via a shared forward-control channel of the wireless link, a channel-assignment message identifying a reverse-traffic channel assigned to the access terminal, wherein the channel-assignment message indicates that a reverse-channel quality of the wireless link exceeds a threshold quality, and (c) as a result of transmitting the indicator, receiving reverse bearer-traffic data instead of reverse null-traffic data via the assigned reverse-traffic channel of the wireless link. Program logic 154 may be executable by processor 146 to carry out various other functions in the second embodiment as well.

V. Exemplary Access Terminal

Figure 6:
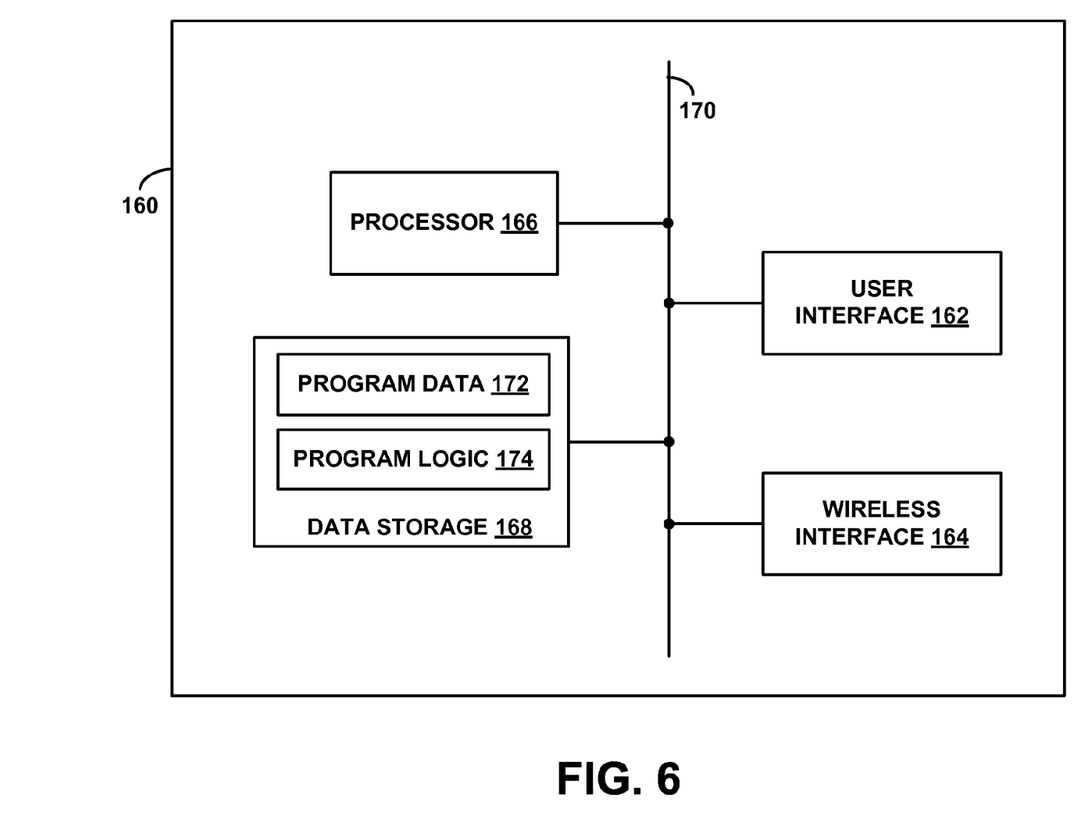
FIG. 6 is a simplified block diagram showing functional components of an exemplary access terminal that is configured to carry out features of the disclosed connection-establishment procedure.

FIG. 6 is a simplified block diagram showing functional components of an exemplary access terminal 160 that is configured to carry out features of the disclosed connection-establishment procedure. As shown in FIG. 6, exemplary access terminal 160 may include a user interface 162, a wireless-communication interface 164, a processor 166, and data storage 168, all linked together via a system bus, network, or other connection mechanism 170. Access terminal 160 may include other components as well.

Referring to FIG. 6, the user interface 162 may be configured to facilitate user interaction with access terminal 160. As such, user interface 162 may include or provide connectivity to various components that facilitate user interaction. For example, user interface 162 may include or provide connectivity to input components such as a touch screen, a navigation pad, a multi-functional button, a thumb wheel, a keyboard or keypad, and/or a microphone for instance. As another example, user interface 162 may include or provide connectivity to output components such as a display screen and/or a speaker for instance. As yet another example, user interface 162 may include signal processing components such as analog-to-digital (A-D) and/or digital-to-analog (D-A) circuitry. Other configurations are possible as well.

Wireless-communication interface 164 may be configured to facilitate wireless communication with an access network according to one or more wireless protocols, such as the protocols noted above. As such, wireless-communication interface 164 may include a chipset (e.g., an MSM™ series chipset manufactured by Qualcomm Incorporated of San Diego, Calif.) and one or more antennas adapted to communicate according to one or more protocols. Other configurations are possible as well.

Processor 166 may comprise one or more processor components, such as general-purpose processors (e.g., a microprocessor), application-specific processors (e.g., an ASIC or DSP), programmable logic devices (e.g., an FPGA), or other processor components now known or later developed. Data storage 168, in turn, may comprise one or more non-transitory computer-readable storage mediums, such as volatile data storage mediums (e.g., RAM registers, and/or cache) and/or non-volatile data storage mediums (e.g., ROM, a hard disk drive, a solid state drive, flash memory, an optical storage device, and/or a floppy disk). Some storage mediums may be integrated in whole or in part with the processor 166. Further, some storage mediums may be external to and/or removable from access terminal 160 and may interface with access terminal 160 in various manners. In one example, as shown, data storage 168 may contain (i) program data 172 and (ii) program logic 174, which may be maintained either separately or together within data storage 168.

Program data 172 may contain information identifying a communication with an access network. For example, program data 172 may contain an identifier of a wireless link over which access terminal 160 is communicating with the access network (e.g., a carrier frequency and a PN offset). As another example, program data 172 may contain identifiers (e.g., Walsh codes) of forward and/or reverse channels over which access terminal 160 is communicating with the access network. As yet another example, program data 172 may contain indicators of forward- and/or reverse-channel quality of a wireless link and/or traffic channels over which access terminal 160 is communicating with the access network. Other examples are possible as well.

Further, program data 172 may contain information relating to wireless links detected by access terminal 160. For example, program data 172 may contain an identifier of each such wireless link (e.g., a carrier frequency and a PN offset). As another example, program data 172 may contain an indicator of forward-channel quality measured on each such wireless link. Other examples are possible as well.

Program logic 174 preferably comprises machine-language instructions that may be executed or interpreted by processor 166 to carry out functions in accordance with the disclosed connection-establishment procedure. For example, according to a first embodiment, program logic 174 may be executable by processor 166 to carry out functions including (a) transmitting a page-response message to an access network via a shared reverse-control channel of a wireless link, wherein the page-response message includes an indication that a forward-channel quality of the wireless link exceeds a threshold quality, and (b) as a result of transmitting the page-response message, (1) receiving a channel-assignment message identifying an assigned forward-traffic channel of the wireless link via a shared forward-control channel of the wireless link, and (2) receiving forward bearer-traffic data instead of forward null-traffic data via the assigned forward-traffic channel. Program logic 174 may be executable by processor 166 to carry out various other functions in the first embodiment as well.

As another example, according to a second embodiment, program logic 174 may be executable by processor 166 to carry out functions including (a) transmitting an origination response message to an access network via a shared reverse-control channel of a wireless link, (b) as a result of transmitting the page-response message, receiving a channel-assignment message identifying an assigned reverse-traffic channel of the wireless link via a shared forward-control channel of the wireless link (where the channel-assignment message may contain an indicator of reverse-channel quality of the wireless link), (c) based on a reverse-channel quality of the wireless link, deciding to transmit reverse bearer-traffic data rather than reverse null-traffic data, and (d) in response to the deciding, transmitting the reverse bearer-traffic data to the access network via the assigned reverse-traffic channel. Program logic 174 may be executable by processor 176 to carry out various other functions in the second embodiment as well.

VI. Conclusion

Embodiments have been described above. Those skilled in the art will understand, however, that changes and modifications may be made to the embodiments described without departing from the true scope and spirit of the present invention, which is defined by the claims.

We claim:
1. A method comprising:
  receiving an access probe from a given access terminal on a given wireless link;
  responsive to receiving the access probe, (a) assigning a forward-traffic channel of the given wireless link to the given access terminal and (b) based at least in part on a forward-channel quality of the given wireless link, making a decision between (i) transmitting a default amount of forward null-traffic data before beginning to transmit forward bearer-traffic data on the assigned forward-traf- fic channel and (ii) transmitting a reduced amount of forward null-traffic data before beginning to transmit forward bearer-traffic data on the assigned forward-traffic channel; and transmitting on the assigned forward-traffic channel in accordance with the decision.

2. The method of claim 1, wherein making the decision based on the forward-channel quality of the given wireless link comprises determining whether a forward-channel quality of the given wireless link exceeds a threshold quality.

3. The method of claim 1, wherein the access probe contains an indicator of forward-channel quality of the given wireless link.

4. The method of claim 3, wherein making the decision based on the forward-channel quality of the given wireless link comprises making the decision based on the indicator of forward-channel quality of the given wireless link.

5. The method of claim 4, wherein the indicator comprises a value for the forward-channel quality of the given wireless link as measured by the given access terminal, and wherein making the decision based on the indicator of forward-channel quality of the given wireless link comprises comparing the value to a threshold quality value to determine whether the value exceeds the threshold quality value.

6. The method of claim 4, wherein the indicator comprises a data bit specifying that the forward-channel quality of the given wireless link as measured by the given access terminal is above a threshold quality value, and wherein making the decision based on the indicator of forward-channel quality of the given wireless link comprises determining a value of the data bit.

7. The method of claim 1, wherein the reduced amount of forward null-traffic data comprises no forward null-traffic data.

8. The method of claim 1, wherein the reduced amount of forward null-traffic data comprises a non-zero amount of forward null-traffic data.

9. The method of claim 1, wherein the access probe comprises a page-response message.

10. A method comprising:
transmitting an access probe to an access network on a given wireless link;
as a result of transmitting the access probe, receiving from the access network a channel-assignment message identifying an assigned reverse-traffic channel of the given wireless link;
responsive to receiving the channel-assignment message, making a decision, based at least in part on a reverse-channel quality of the given wireless link, between (i) transmitting a default amount of reverse null-traffic data before beginning to transmit reverse bearer-traffic data on the assigned reverse-traffic channel and (ii) transmitting a reduced amount of reverse null-traffic data before beginning to transmit reverse bearer-traffic data on the assigned reverse-traffic channel; and
transmitting on the assigned reverse-traffic channel in accordance with the decision.

11. The method of claim 10, wherein making the decision based on the reverse-channel quality of the given wireless link comprises determining whether a reverse-channel quality of the given wireless link exceeds a threshold quality.

12. The method of claim 10, wherein the channel-assignment message contains an indicator of reverse-channel quality of the given wireless link.

13. The method of claim 12, wherein making the decision based on the reverse-channel quality of the given wireless link comprises making the decision based on the indicator of reverse-channel quality of the given wireless link.

14. The method of claim 13, wherein the indicator comprises a value for the reverse-channel quality of the given wireless link as measured by the access network, and wherein making the decision based on the indicator of reverse-channel quality of the given wireless link comprises comparing the value to a threshold quality value to determine whether the value exceeds the threshold quality value.

15. The method of claim 13, wherein the indicator comprises a data bit specifying that the reverse-channel quality of the given wireless link as measured by the access network is above a threshold quality value, and wherein making the decision based on the indicator of reverse-channel quality of the given wireless link comprises determining a value of the data bit.

16. The method of claim 10, wherein the reduced amount of reverse null-traffic data comprises no reverse null-traffic data.

17. The method of claim 10, wherein the reduced amount of reverse null-traffic data comprises a non-zero amount of reverse null-traffic data.

18. The method of claim 10, wherein the access probe comprises an origination message.

19. A base station comprising:
an access-terminal communication interface configured to facilitate communication with one or more access terminals via one or more wireless links;
an access-network communication interface configured to facilitate communication with one or more access-network entities;
a processor;
data storage; and
program instructions stored in data storage and executable by the processor to:
receive an access probe from a given access terminal on a given wireless link;
responsive to receiving the access probe, (a) assign a forward-traffic channel of the given wireless link to the given access terminal and (b) based at least in part on a forward-channel quality of the given wireless link, make a decision between (i) transmitting a default amount of forward null-traffic data before beginning to transmit forward bearer-traffic data on the assigned forward-traffic channel or (ii) transmitting a reduced amount of forward null-traffic data before beginning to transmit forward bearer-traffic data on the assigned forward-traffic channel; and
transmit on the assigned forward-traffic channel in accordance with the decision.

20. An access terminal comprising:
an wireless-communication interface configured to facilitate wireless communication with an access network via one or more wireless links;
a processor;
data storage; and
program instructions stored in data storage and executable by the processor to:
transmit an access probe to an access network on a given wireless link;
as a result of transmitting the access probe, receive from the access network a channel-assignment message identifying an assigned reverse-traffic channel of the given wireless link;
responsive to receiving the channel-assignment message, make a decision, based at least in part on a reverse-channel quality of the given wireless link, between (i) transmitting a default amount of reverse null-traffic data before beginning to transmit reverse bearer-traffic data on the assigned reverse-traffic channel or (ii) transmitting a reduced amount of reverse null-traffic data before beginning to transmit reverse bearer-traffic data on the assigned reverse-traffic channel; and transmit on the assigned reverse-traffic channel in accordance with the decision.

* * * * *